July 21, 1964          D. R. RHODES          3,142,058
AURAL INDICATING DOPPLER RADAR
Filed June 12, 1961          2 Sheets-Sheet 2
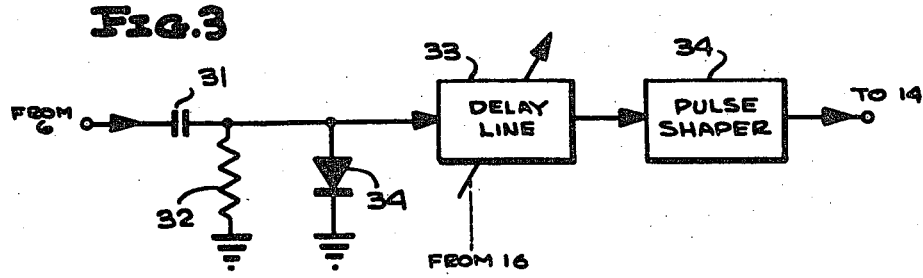
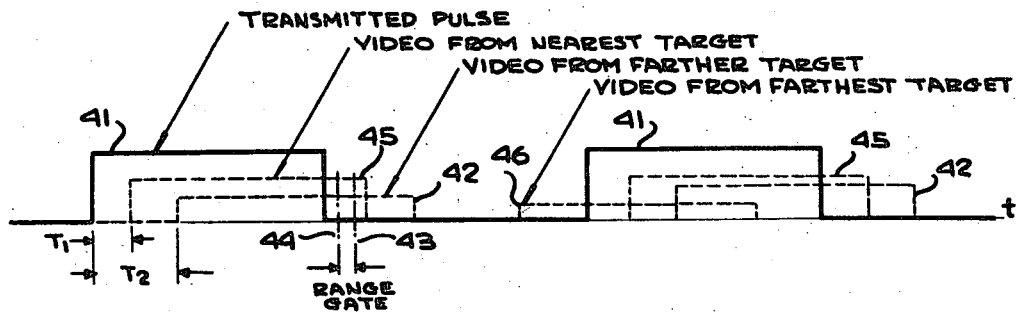
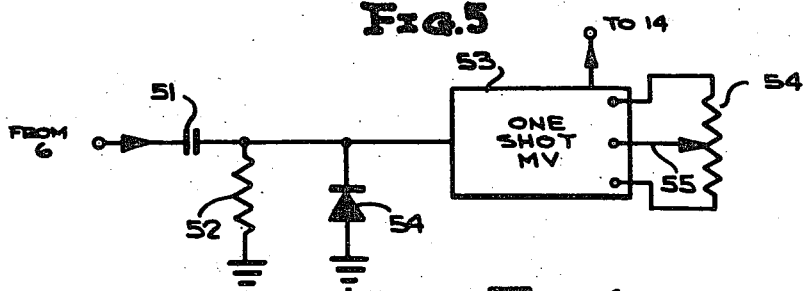
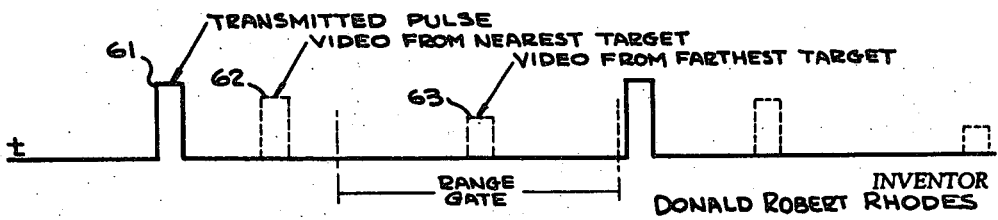
INVENTOR
DONALD ROBERT RHODES
BY *Hurwitz and Rose*
ATTORNEYS 3,142,058
AURAL INDICATING DOPPLER RADAR
Donald R. Rhodes, Winter Park, Fla., assignor to Radiation, Incorporated, Melbourne, Fla., a corporation of Florida
Filed June 12, 1961, Ser. No. 116,570
15 Claims. (Cl. 343—13)

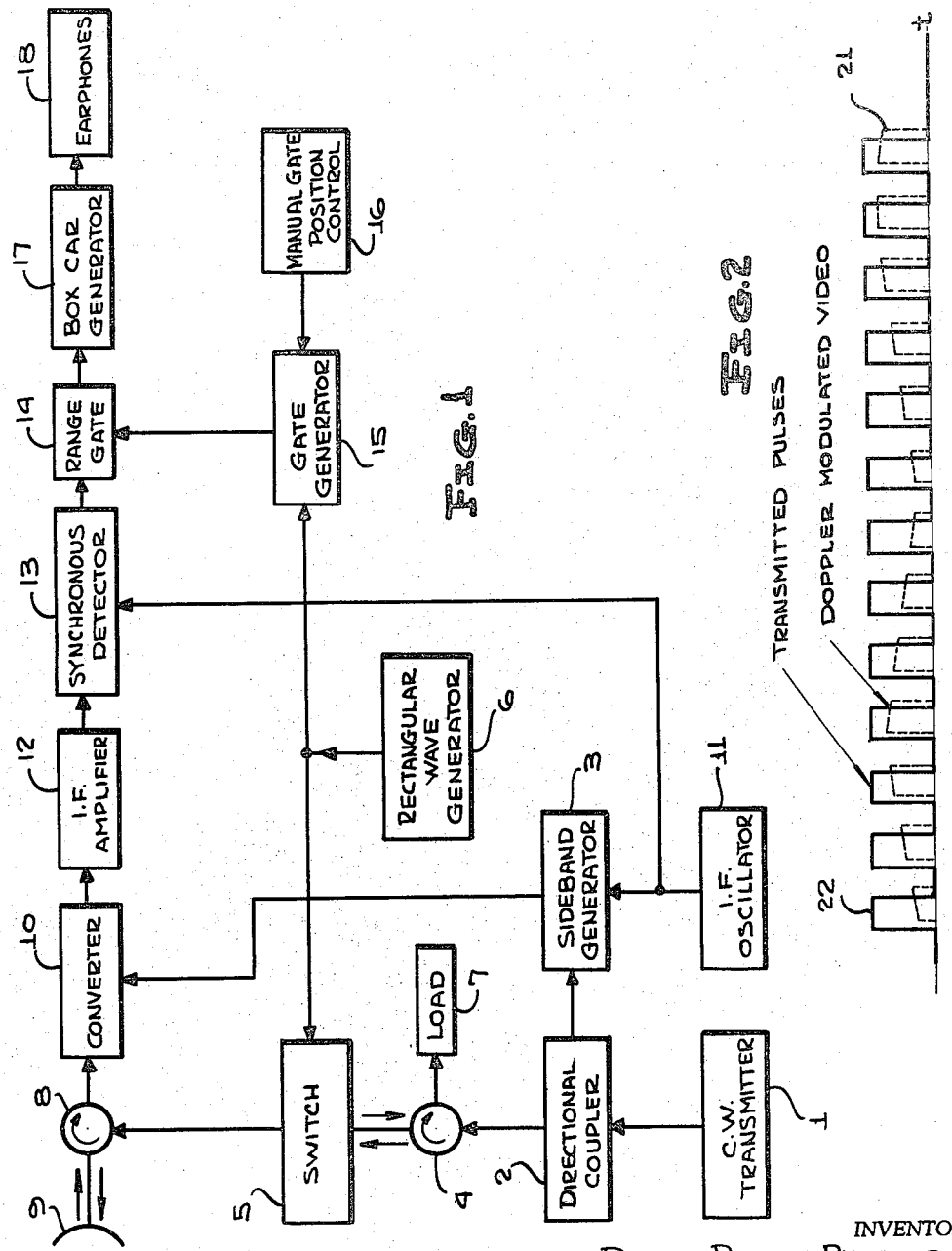

The present invention relates generally to a method for determining the range of a moving target and more particularly to a radar method for determining target range by Doppler effect and producing an audio signal to provide an aural effect indicative of range wherein a sharp aural transition occurs at a time corresponding with target range.

In Doppler radar systems, the signal reflected from a moving object is received back at the radar apparatus at a time subsequent to the generation of the transmitted pulse, the time being determined by the target location relative to the apparatus. The received signal is shifted in carrier frequency by an amount commensurate with target velocity and the position rate of change of other objects located on the target due to Doppler effect. In Doppler radar systems, the Doppler frequency spectrum reflected from each moving target or from each stationary target with moving parts is distinctive. The distinction is sufficiently great to enable the human ear to distinguish between two targets having identical velocities and locations relative to the detector. This results because targets containing different moving parts have sufficiently separated frequency spectrums to be perceived by the human ear, even though they are travelling at the same net velocity, e.g., the Doppler frequency spectrums of two and four engined aircraft are quite different even when they are flying at identical speeds. Thus, a human operator is able to easily distingiush one target from another if provided with an aural indication of reflected Doppler radar signals. Accordingly, the words moving target in the present specification and claims define an object that is moving relative to the detector or is stationary but has moving parts.

By utilizing the human ear to sense an intensity transition in the Doppler signal supplied back to the radar apparatus from the reflecting target, it is possible, according to my invention, to determine target range with great degrees of accuracy, if desired. The transition occurs as a result of the cessation or initiation of the reflected pulse corresponding with the trailing or leading edges of the transmitted pulse.

Accordingly, it is an object of the present invention to provide a new and improved method for determining the range of one or more moving targets or stationary targets having moving parts wherein an aural signal is generated commensurate with the Doppler effect of each target and an intensity transition in the aural signal is sensed to determine the range of the target associated with the signal.

It is another object to provide a method for determining the range of one or more moving targets or stationary targets having moving parts wherein reflected pulses from the target of substantial duration are modulated in accordance with target Doppler effect, a variable position narrow range gate is positioned to sense an intensity change either in the leading or trailing edge of the pulse and an aural indication of target Doppler effect is provided to the operator for indicating target position.

A further object is to provide a method for determining the range of one or more moving targets or stationary targets having moving parts wherein short duration pulses reflected from the target have their envelope amplitude modulated in accordance with target Doppler effect, a variable width range gate is positioned to sense an intensity change in the reflected pulse and an aural indication of target Doppler effect is provided to the operator for indicating target position.

An additional object is to provide a method for use with Doppler radar systems wherein remote and proximate target positions are determined with substantially the same facility on the part of the operator by providing him with an aural indication of each target Doppler effect and having him position a range gate so only the remote target affects the indication.

Briefly, the present invention contemplates transmitting a radar pulse to a moving target and receiving the pulse reflected from the target. Due to target speed, the carrier frequency of the returned pulse is varied from that of the transmitted pulse. The detected envelope of the received pulses is amplitude modulated in accordance with target speed. A variable range gate is positioned so an intensity transition in the received detected signal may be sensed, i.e., the beginning or end of the received pulses is sensed.

In one embodiment, the transmitted pulses are of substantial duration and a range gate of very short, constant duration is variably positioned at the beginning or end of the received, detected pulses. In another embodiment, short duration pulses are transmitted and a range gate of variable width is positioned so its leading edge coincides with an intensity transition in the received, detected signal.

The signal sampled by the range gate, in both embodiments, is converted to an audio signal that is fed to an aural indicator, thereby providing an acoustic indication for the operator. When the range gate is positioned immediately prior to a transition of the received pulse, e.g., just before the received pulse terminates, an audio signal is supplied to the operator having a frequency commensurate with target Doppler effect. However, by placing the range gate immediately after the pulse has terminated, no audio signal is supplied to the operator because no signal is supplied from the gate to the indicator. If a plurality of targets is in the area, each having a different Doppler effect, the operator obtains an aural indication of each target range by noticing the tone difference in the signal he hears when the range gate is placed on one sdie or the other of a detected pulse termination. Target range is ascertained by measuring range gate position with respect to the time the transmitted pulse occurs.

Remote and proximate target ranges are determined with equal facility because the strong signals from the close targets which normally predominate over the weak signals of the distant targets are not supplied to the operator's ears because of the gate position when tracking distant signals. Due to the characteristics of the human ear, a weak signal appears almost as loud as a strong signal when a person is listening to it alone.

The above and still further objects, features and advantages of the present invention will become apparent upon consideration of the following detailed description of one specific embodiment thereof, especially when taken in conjunction with the accompanying drawings, wherein:

FIGURE 1 of the drawings discloses a block diagram of a preferred form of the present invention;

FIGURE 2 is an illustration of the nature of the transmitted and received pulses in the system of FIGURE 1;

FIGURE 3 is a circuit diagram of gate generator 15, FIGURE 1, according to one embodiment of the present invention;

FIGURE 4 is an illustration of the pulses generated with the type of gate generator illustrated on FIGURE 3;

FIGURE 5 is a circuit diagram of another embodiment for gate generator 15 of FIGURE 1; and FIGURE 6 is an illustration of the type pulses generated with the embodiment of gate generator 15 disclosed in FIGURE 5.

The block diagram of the present invention, FIGURE 1, comprises a continuous wave sinusoidal transmitter oscillator 1, connected to conventional directional coupler 2.

Directional coupler 2 is connected to side band generator 3, a conventional mixer circuit, and is also connected to circulator 4. The sinusoidal signal from transmitter 1 is supplied through circulator 4 to switch 5. Switch 5 is closed by the periodic rectangular wave output signal of generator 6 so the signal is supplied to circulator 8 for a portion of each cycle in the signal generated by generator 6. When switch 5 is opened in response to the negative voltage applied thereto from generator 6, energy is supplied back to load 7 via circulator 4. Thereby, energy from transmitter 1 is not permitted to radiate into free space when transmitter 1 is not coupled to circulator 8.

As switch 5 is opened and closed in response to the signal from generator 6, circulator 8 supplies energy to conventional radar antenna 9 in the form of pulse modulated carrier signals. The reflected signal from a moving target is picked up by antenna 9 and supplied through circulator 8 to conventional heterodyne converter 10. The carrier frequency of the received pulse differs from the carrier frequency of the transmitted pulse by the Doppler frequency spectrum associated with the target. All moving targets or stationary targets having moving parts affect the Doppler frequency shift of the reflected carrier and each target has a frequency spectrum peculiar to it. This frequency spectrum permits one target to be distinguished from another by the human ear, even though the targets are moving at identical speeds. The Doppler frequency spectrum of each target is in the audio range, and for a particular target may be as low as 30 or as high as 15,000 cycles, the former frequency being commensurate with the speed of a crawling man, detectable with this method, and the latter frequency being commensurate with helicopter propeller rotation, at a carrier frequency of 35 kmc.

Sideband generator 3, a conventional mixer, combines the intermediate frequency generated by I.F. oscillator 11 with the carrier frequency supplied to it by coupler 2 to generate a signal equal in frequency to the sum and difference of the carrier and I.F. signals. The output signal from side band generator 3 is mixed with the received signal in heterodyne converter 10 to generate an output signal having substantially the same frequency as produced by I.F. oscillator 11. The output signal of converter 10 differs in frequency from that of oscillator 11 only by the Doppler frequency of the received signal. The pulse modulated output signal of converter 10 is supplied through a conventional I.F. amplifier 12 to synchronous detector 13 which is also connected to I.F. oscillator 11.

Detector 13 produces output signal pulses commensurate in amplitude with the frequency deviation between the output signals of oscillator 11 and I.F. amplifier 12. Thus, the output signal of synchronous detector 13 is a series of pulses having its envelope amplitude modulated by the Doppler frequency of the moving target, as disclosed by the dotted pulses 21, FIGURE 2. Received pulses 21 are time delayed with respect to transmitted pulses 22 because of the propagation time between transmission of the signal from antenna 9 to the target and reflection of the signal back to the antenna.

Output signal 21 of detector 13 is supplied to range gate 14, controlled by gate generator 15. Gate generator 15, synchronized with square wave generator 6, produces a pulse to open range gate 14 in response to manual gate position control 16. The narrow pulses fed through range gate 14 are stretched in box car generator 17, thereby producing an audio signal commensurate with the moving target Doppler frequency of interest. The audio signal from generator 17 is supplied to an aural indicator 18, such as a pair of earphones or a loud speaker. Detector 13 includes a filter to prevent any D.C. output signals thereof from being supplied to generator 17.

FIGURE 3, disclosing one embodiment of gate generator 15, comprises a differentiating circuit containing capacitor 31 and resistor 32. One terminal of capacitor 31 is connected to square wave generator 6 to produce a short duration position pulse in response to the leading edge of the rectangular pulse generated by generator 6 and a negative short duration pulse in response to the trailing edge of the rectangular pulse. Only the negative pulse, responsive to the trailing edge, is supplied to delay line 33, the positive pulse being shunted through diode 34. The amount of delay introduced by variable delay line 33 is manually controlled by gate position control 16 and its output signal is supplied to pulse shaper 34. The short duration pulses from shaper 34 open range gate 14, FIGURE 1, to supply short duration pulses from detector 13 to generator 17.

With the type of gate generator disclosed in FIGURE 3, wherein range gate 14 is open only for a short time period, generator 6 is designed so the transmitted pulses are of substantial duration, e.g., 50% of the total period of the generator, as illustrated in FIGURE 4 by pulses 41. Pulses 41 are transmitted from antenna 9 to a moving target and are subsequently reflected back to antenna 9 from first and second targets as indicated by pulses 45 and 42, respectively. Pulses 45 and 42 are of equal duration to pulses 41 and displaced therefrom by the times indicated by $T_1$ and $T_2$, respectively, the time displacements due to propagation time from antenna 9 to the targets and back. Narrow range gate 43, 44 produced by generator 15 is positioned by delay line 33 and gate position control 16 to substantially coincide with the termination of pulse 42. With the range gate positioned just prior to termination of pulse 42, an audio frequency spectrum signal is generated by box car generator 17 and the operator hears a tone commensurate in frequency with Doppler effect of the target associated with pulse 42. With range gate 43, 44 positioned just after termination of pulse 42, no signal is supplied to box car generator 17 and consequently no tone is heard in ear phones 18. Thus, the delay introduced by delay line 33 of gate generator 15 between the termination of the transmitted pulse and the time when a sudden transition occurs in pulse 42 indicates target range and this sudden transition is easily detected as the presence or absence of the Doppler frequency spectrum tone in ear phones 18.

With another target closer to antenna 9 than the target producing pulse 42, an additional pulse 45 occurring prior to pulse 42 is generated. This pulse contains a different Doppler frequency spectrum than pulse 42 because the target it is associated with, will generally be of a different character than that of the target associated with pulse 42. With range gate 43, 44 positioned prior to termination of pulse 45, tones will be produced in ear phones 18 in response to the Doppler frequency spectrums of both pulses 42 and 45. As range gate 43, 44 is moved to a position after cessation of pulse 45, only a single Doppler frequency spectrum is supplied through range gate 14 to box car generator 17 and consequently the tone heard in ear phones 18 is changed. Thereby, a position indication of the target producing signal 45 is obtained by placing the range gate so a distinct difference in the tone heard from ear phones 18 is noticed. This difference arises because of the frequency spectrum difference of the tones generated therein due to the different Doppler frequencies. At present the only detector capable of discerning the difference between the different frequency spectrums, which may be separated by a few tens of cycles, is the human ear. Thus the presence of a human to operate this equipment in accordance with the information heard is virtually essential.

To determine the range of a very remote target which produces a reflected pulse having a trailing edge over lapping with the next transmitted pulse, as indicated by rectangular wave 46, the leading, rather than the trailing edge of the pulse, is employed to obtain an indication of range. With the very remotely located target which produces pulse 46, an interval exists between pulses 42 and 46 wherein no audio signal is supplied to ear phones 18. As the range gate 43, 44 is moved further away from pulse 42, a tone is suddenly heard in ear phones 18 and an indication is obtained of the very remote target range.

To determine if the leading or the trailing edges of the reflected and transmitted pulses are to be employed as the measuring and reference times, respectively, it is necessary to note whether an aural output signal is initiated or terminated as range gate 43, 44 is positioned at more remote positions from transmitted pulse 41. To determine range with both types of conditions, i.e., tone initiations or terminations, delay line 33 is calibrated with two scales, one scale being folded back on another.

FIGURE 5 discloses another form for gate generator 15, FIGURE 1. A differentiator circuit containing capacitor 51 and resistor 52 is connected to generator 6, to produce short duration positive and negative pulses in response to the short duration pulses produced by generator 6, when the apparatus of FIGURE 5 is employed. The short duration pulses produced by the differentiator, in response to the leading edges of the pulses produced by generator 6, are supplied to one shot multivibrator 53, while the negative pulses produced in response to the trailing edge of the signal generated by generator 6 are shunted through diode 54 to ground. One shot multivibrator 53, of conventional design, supplies a negative output voltage to range gate 14 for a predetermined time period after the positive differentiator output pulse is applied thereto. This negative voltage maintains gate 14 closed so no signals are supplied to generator 17 and earphones 18. After a predetermined period of time, controlled by the position of slider 55 on potentiometer 54, one shot multivibrator switches state and applies a positive, rather than a negative, voltage to range gate 14. Thereby, range gate 14 is open until the next pulse is applied to one shot multivibrator 53 and reflections received thereafter are supplied to generator 17, resulting in associated tones in earphones 18.

With the type of gate generator disclosed in FIGURE 5, rectangular wave generator 6 is designated to open switch 5 for relatively short time periods so the signal transmitted and received by antenna 9 is a narrow width pulse which amplitude modulates the carrier signal. The reflected signal picked up by antenna 9 differs in carrier frequency from the transmitted signal by the Doppler frequency commensurate with the speed of the target being tracked. The output signal of synchronous detector 13 with this type of arrangement is substantially the same as that illustrated in FIGURE 2 by pulses 21, but it is to be understood the pulse width is considerably smaller than indicated on the figure. The pulse width is approximately the same order of magnitude as the width of the range gate employed with the apparatus of FIGURE 3.

A narrow pulse 61, FIGURE 6, is transmitted from antenna 9 and a reflection from a first target is received as narrow pulse 62 differing in carrier frequency from that of pulse 61 only by the Doppler frequency associated with the target velocity. A further pulse 63 also differing in carrier frequency from oscillator 1 by the radial velocity of its associated target is subsequently reflected back to antenna 9 from a target more remote than that producing pulse 62.

With the leading edge of the range gate generated by the apparatus of FIGURE 5 positioned between pulses 61 and 62, an audio tone representative of both targets is heard in earphones 18. As the range gate leading edge is moved to a point just after pulse 62 ends, the tone in earphones 18 suddenly changes since only a single audio frequency spectrum in response to the Doppler effect of the target associated with pulse 63 is supplied thereto. Thus range indication of the target associated with pulse 62 is obtained by the position of slider 55, utilized to control the leading edge of the rectangular pulse used to open range gate 14. As the range gate leading edge is translated to a point immediately after cessation of pulse 63, the audio signal in earphones 18 is terminated, thereby an indication of second target range is readily obtained. The position of slider 55 relative to potentiometer 54 may be readily calibrated in terms of range.

The system of FIGURE 5 is slightly superior to that of FIGURE 3 insofar as there is no necessity to employ a pair of calibrated scales, one for measuring with respect to the leading edge of the transmitted pulse and one for measuring with respect to the trailing edge thereof. With the apparatus of FIGURE 5 it is necessary only to employ a single calibration scale and no thought of which to use is necessary. The systems of both FIGURES 3 and 5 contain the feature that strong signals from proximate targets do not adversely overpower weak signals from remote targets. In the short transmitted pulse system, as the range gate length decreases reflections from nearby targets are eliminated, thereby an indication of a remote target only is provided.

While I have described and illustrated two specific embodiments of my invention, it will be clear that variations of the details of construction which are specifically illustrated and described may be resorted to without departing from the true spirit and scope of the invention as defined in the appended claims.

I claim:
1. A method for determining the position of a moving target comprising the steps of periodically transmitting a pulse modulated constant frequency carrier signal, receiving said signal as signal pulses reflected from said target, the carrier frequency of said received pulses differing from the transmitted carrier frequency by the Doppler effect frequency of said target, generating, in response to the received signal, pulses having an amplitude modulated envelope commensurate with the Doppler effect frequency of said target, providing a gate for the pulses having the amplitude modulated envelope, said gate being positionable at variable times with respect to the transmitted pulses, generating an aural indication commensurate with the envelope of the gated signal, adjusting the gate position to coincide with an intensity transition in the pulses having the amplitude modulated envelope, said gate being positioned in response to a sudden transition in the sensed aural indication and measuring the time difference between a transition in the transmitted and received signals as determined by the position of the gate.

2. The method of claim 1 wherein the duration of the transmitted pulse is substantial compared with the time period between adjacent pulses, said gate being of short constant duration compared to the duration of the transmitted pulse.

3. The method of claim 1 wherein the duration of the transmitted pulse is short compared to the time period between adjacent pulses, said gate being of variable width and terminating when a pulse is transmitted.

4. In a method for determining the position of a moving target comprising the steps of periodically transmitting a pulse modulated constant frequency carrier signal, receiving said signal as signal pulses reflected from said target, the carrier frequency of said received pulses differing from the transmitted carrier frequency by the Doppler effect frequency of said target, generating, in response to the received signal, pulses having an amplitude modulated envelope commensurate with the Doppler effect frequency of said target, providing a gate for the pulses having the amplitude modulated envelope, said gate being positionable at variable times with respect to the transmitted pulses, generating an aural indication commensurate with the envelope of the gated signal, and adjusting the gate position to coincide with an intensity transition in the pulses having the amplitude modulated envelope, said gate being positioned in response to an intensity transition in the sensed aural indication.

5. A method for determining the range of a first target remotely located target from a particular point and a second target in relative proximity to said point comprising the steps of: periodically transmitting a pulse modulated constant frequency carrier signal from said point, the duration of said transmitted pulse being substantial compared to the time period between adjacent pulses; receiving said signal as first signal pulses reflected from said proximately located target; receiving said signal as second signal pulses reflected from said remotely located target, said targets being located to cause initiation of the second signal pulses subsequent to the termination of the first signal pulses, the carrier frequency of said first and second received pulses differing from the transmitted carrier frequency by the Doppler effect frequencies of said proximately and remotely located targets, respectively; generating, in response to the first signal pulses, pulses having a first amplitude modulated envelope commensurate with the Doppler effect frequency of said proximately located target; generating, in response to the second pulses, pulses having a second amplitude modulated envelope commensurate with the Doppler effect frequency of said remotely located target; providing a narrow width gate of fixed duration for the pulses having said first and second amplitude modulated envelopes, said gate being positionable at variable times with respect to the transmitted pulses; generating an aural indication commensurate with the envelope of the gated signal; adjusting the gate position to coincide with the trailing edge of the pulses having said first envelope, said gate being positioned in response to the trailing edge of the sensed aural indication of said first envelope; and adjusting the gate position to coincide with the leading edge of the pulses having said second envelope, said gate being positioned in response to initiation of the sense daural indication of said second envelope.

6. The method of claim 5 further including the steps of measuring the time between initiation of said transmitted pulse and the gate position coinciding with the trailing edge of the pulses having said first envelope to provide an indication of the proximately located target and measuring the time between initiation of said transmitted pulse and the gate position coinciding with the leading edge of the pulses having said second envelope to provide an indication of the remotely located target.

7. A method for determining the position of a moving target comprising the steps of periodically transmitting a pulse modulated constant frequency carrier signal, receiving said signal as signal pulses reflected from said target, generating signal pulses having an envelope amplitude modulated in accordance with target Doppler effect, said signal pulses being generated in response to the received pulses, aurally sensing an intensity transition in said signal pulses, and measuring the time period between a sudden transition in the transmitted pulses and the sensed transition to provide an indication of target range.

8. A method for determining the range of a moving target with an aural indicator comprising the steps of periodically transmitting a pulse modulated constant frequency carrier wave, receiving said wave as reflected from said target, wherein the carrier frequency of the received wave differs from the carrier frequency of the transmitted wave by the Doppler effect frequency of the target, detecting the difference in carrier frequency between the transmitted and received waves to derive a series of detected pulses the envelope of which is amplitude modulated at the Doppler effect frequency, the edges of said detected pulses being displaced in time from the respective edges of the transmitted wave by a time directly proportional to target range, gating said detected pulses to the aural indicator, adjusting the time at which gating occurs to coincide with an intensity transition deriving from the aural indicator, and measuring said time displacement as a function of gating time.

9. In a method for determining the position of a moving target with an aural indicator, comprising periodically transmitting a pulse modulated constant frequency carrier wave, receiving said wave as reflected from said target, wherein the carrier frequency of the received wave differs from the carrier frequency of the Doppler effect frequency of the target, detecting the difference in carrier frequency between the transmitted and received waves to derive a series of detected pulses the envelope of which is amplitude modulated at the Doppler effect frequency, gating said detected pulses to the aural indicator, and adjusting the time at which gating occurs to coincide with an intensity transition deriving from the aural indicator.

10. In a system utilized for providing target range, means for periodically transmitting a pulse modulated constant frequency carrier wave, means for receiving said wave as reflected from said target, wherein the carrier frequencies of the transmitted and received waves differ by the Doppler effect frequency of the target, means responsive to the frequency difference between the carrier of the received wave and the carrier from the transmitted wave for deriving a series of detected pulses the envelope of which is amplitude modulated at the Doppler effect frequency, an aural indicator for said detected pulses, and a variable position gate for selectively coupling the detected pulses to said indicator.

11. The apparatus of claim 10 including means for stretching the detected pulses passed by said gate to a signal concentrated in the audio spectrum, and means for coupling said signal to said indicator.

12. The apparatus of claim 11 wherein the transmitted pulses are of relatively short duration compared to the time interval between adjacent transmitted pulses, and said gate is of long duration compared to said transmitted pulse.

13. The apparatus of claim 11 wherein the transmitted pulses subsist for a substantial duration of the time between adjacent transmitted pulses, and said gate is of short duration compared to said transmitted pulse.

14. The apparatus of claim 10 wherein said means for deriving the detected pulses comprises: means for heterodyning the received carrier wave with a wave of constant frequency to derive a signal of frequency $f_{i.f.} \pm (f_r - f_c)$, where $f_c$ is the transmitted carrier frequency, $f_{i.f.}$ is an I.F. frequency, and $f_r$ is the carrier frequency of the received wave, and means for comparing the frequency of said signal with $f_{i.f.}$.

15. The apparatus of claim 10 including means for stretching the detected pulses passed by said gate to a signal concentrated in the audio spectrum, means for coupling said signal to said indicator, and wherein said means for deriving the detected pulses comprises: means for heterodyning the received carrier wave with a wave of constant frequency to derive an I.F. wave of frequency $f_{i.f.}$, where $f_{i.f.}$ is an I.F. frequency, $f_r$ is the frequency of the received carrier, $f_c$ is the frequency of the transmitted carrier, an I.F. amplifier responsive to said I.F. wave, and a synchronous detector for comparing the frequency of the wave deriving from the I.F. amplifier with $f_{i.f.}$.

References Cited in the file of this patent
UNITED STATES PATENTS

| | | |
|---|---|---|
| 2,491,542 | Woodyard et al. | Dec. 20, 1949 |
| 2,522,367 | Guanella | Sept. 12, 1950 |